United States Patent

Asaro et al.

[11] Patent Number: 6,124,868
[45] Date of Patent: *Sep. 26, 2000

[54] METHOD AND APPARATUS FOR MULTIPLE CO-PROCESSOR UTILIZATION OF A RING BUFFER

[75] Inventors: Anthony Asaro, Scarboro; Indra Laksono, Richmond Hill; James Doyle, Thornhill, all of Canada

[73] Assignee: ATI Technologies, Inc., Thornhill, Canada

[*] Notice: This patent issued on a continued prosecution application filed under 37 CFR 1.53(d), and is subject to the twenty year patent term provisions of 35 U.S.C. 154(a)(2).

[21] Appl. No.: 09/047,319

[22] Filed: Mar. 24, 1998

[51] Int. Cl.[7] ........................................ G06F 15/16
[52] U.S. Cl. .......................... 345/513; 345/503; 345/521
[58] Field of Search .................................. 345/507–509, 345/511–513, 526, 515, 503, 521; 710/52–54, 56

[56] References Cited

U.S. PATENT DOCUMENTS 5,913,923   6/1999   Dunlap et al. .......................... 710/100
5,925,099   7/1999   Futral et al. ............................ 709/204

*Primary Examiner*—Kee M. Tung
*Attorney, Agent, or Firm*—Markison & Reckamp, P.C.

[57] ABSTRACT

A method and apparatus for a processing system to utilize a ring buffer includes a host processor, memory, and at least one co-processor. The host processor generates a plurality of data blocks that relates to a particular application (e.g., word processing application, drafting application, presentation application, spreadsheet application, video game application, etc.). The host processor writes data elements of the data blocks into the memory, which is organized in a ring buffer manner. As the host processor enters the data elements into the ring buffer, it updates a head pointer, which indicates the most current address of a data element entered into the ring buffer, in its local cache. The co-processor retrieves the data elements from the ring buffer and performs a co-processor function in support of the particular application. As the co-processor retrieves data elements from the ring buffer, it updates a tail pointer, which indicates the most recently read data element from memory, or executed data element. The co-processor and host processor exchange the updated tail and header pointers as they are updated, such that both the co-processor and host processor have current records of the tail and header pointers.

17 Claims, 3 Drawing Sheets

METHOD AND APPARATUS FOR MULTIPLE CO-PROCESSOR UTILIZATION OF A RING BUFFER

TECHNICAL FIELD OF THE INVENTION

This invention relates generally to co-processors and more particularly to multiple co-processors utilizing a ring buffer.

BACKGROUND OF THE INVENTION

A computer is known to include a central processing unit, system memory, video graphics circuitry, audio processing circuitry, and peripheral ports. The peripheral ports allow the computer to interface with peripheral devices such as printers, monitors, external tape drives, Internet, etc. In such a computer, the central processing unit functions as a host processor while the video graphics circuit functions as a loosely coupled co-processor. In general, the host processor executes applications and, during execution, calls upon the co-processor to execute its particular function. For example, if the host central processing unit requires a drawing operation to be done, it requests, via a command through a command delivery system, the video graphics co-processor to perform the drawing function.

In many situations, the host central processing unit needs to know the current status of the co-processor, or co-processors, before it can continue with processing the particular application and/or before sending new commands to the co-processor. The host central processing unit obtains such status information from the co-processors via a handshaking protocol. In essence, the hosts central processing initiates the handshaking protocol by poling a co-processor to obtain its status and by poling a co-processor register to obtain the stored status. The host processor then determines whether the co-processors status has changed. If so, host processor updates the co-processor register and continues with additional processing operations. If not, the host processor waits unit the co-processor has completed the current task. Such a technique is known as pole and register writes.

To reduce the host processor's idle time while it is waiting for the co-processor, a command first-in, first-out ("FIFO") queue may be incorporated. The command FIFO stores queued commands from the host processor that are awaiting execution by the co-processor. When the co-processor is able to perform a command, it retrieves the command from the command FIFO. As the co-processor executes a queued command, it updates a co-processor register. In this implementation, the host processor needs to verify that the command FIFO is not full and still needs to read the co-processor register to determine the current status of the co-processor. If the command FIFO is relatively small, i.e., holds a limited number of commands, the host processor still experiences wait cycles while the co-processor completes the processing of a command thereby freeing space in the command FIFO.

Increasing the size of the command FIFO, such that the host processor can download as many commands as needed, may reduce the wait cycles. But, by increasing the command FIFO, the required memory is increased, as is the die area, and the cost of the co-processor.

Therefore, a need exists for a method and apparatus that improves concurrency between a host processor and co-processors that substantially eliminates the need for polling and without substantial increase to the size the command FIFO.

DETAILED DESCRIPTION OF A PREFERRED EMBODIMENT

Generally, the present invention provides a method and apparatus for a processing system to utilize a ring buffer. The processing system includes a host processor, memory, and at least one co-processor. The host processor generates a plurality of data blocks that relates to a particular application (e.g., word processing application, drafting application, presentation application, spreadsheet application, video game application, etc.). The host processor writes data elements of the data blocks into the memory, which is organized in a ring buffer manner. As the host processor enters the data elements into the ring buffer, it updates a head pointer, which indicates the most current address of a data element entered into the ring buffer, in its local cache. The co-processor retrieves the data elements from the ring buffer and performs a co-processor function in support of the particular application. As the co-processor retrieves data elements from the ring buffer, it updates a tail pointer, which indicates the most recently read data element from memory, or executed data element. The co-processor and host processor exchange the updated tail and header pointers as they are updated, such that both the co-processor and host processor have current records of the tail and header pointers. With such a method and apparatus, the host processor does not need to poll the co-processor as to its status, the data elements being executed, or which data elements that have been retrieved from the ring buffer. As such, the host processor is no longer dependent on the co-processor for status information, thus it can continuously provide data elements to the memory improving the concurrency with the co-processor.

Figure 1:
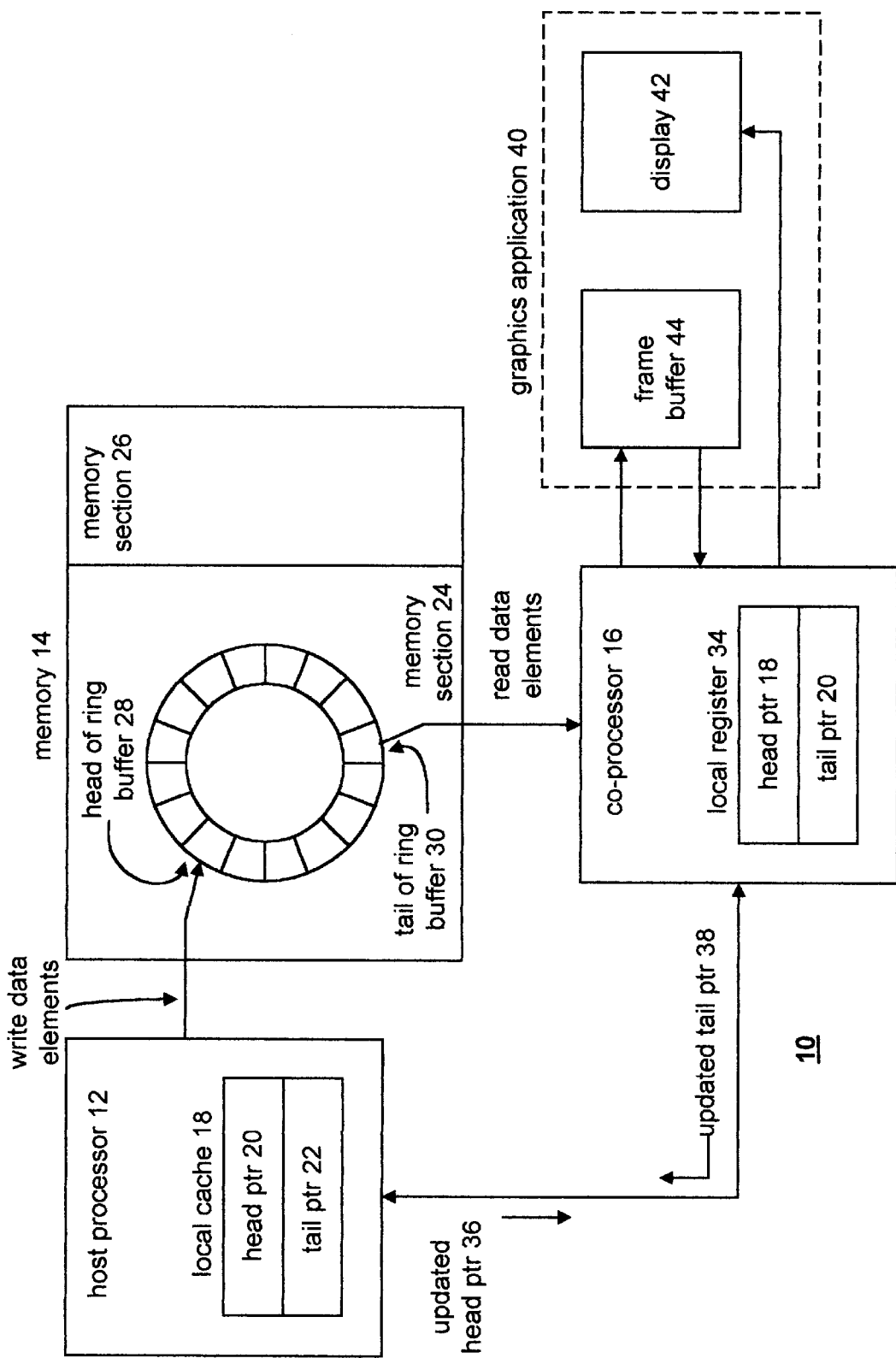
FIG. 1 illustrates a schematic block diagram of a computing system that includes a host processor and co-processor in accordance with the present invention.

The present invention can be more fully described with reference to FIGS. 1 through 3. FIG. 1 illustrates a processing system 10 that includes a host processor 12, memory 14 and a co-processor 16. The host processor 12, which may be a central processing unit in a computer such as a personal computer, laptop computer, and/or work station, includes a local cache 18. The local cache includes at least two memory segments, one for storing the head pointer 20 and a second for storing the tail pointer 22.

The memory 14 includes a first memory section 24 that is organized as a ring buffer and a second memory section 26. The memory 14 may be a computer system memory, local memory to the host processor, local memory to the co-processor and/or a combination thereof. Such memory may be read only memory, random access memory, floppy disk memory, hard drive memory, magnetic tape memory, CD memory, DVD memory and/or any device that stores digital information. The second memory section 26 may store a sub-routine data block that is retrieved and executed by the co-processor 16.

As shown, the ring buffer memory section 24 includes a circular memory arrangement wherein one of the entries is identified as being the head of the ring buffer 28 and the other as being identified as the tail of the ring buffer 30. In operation, the host processor 12 writes data elements into the memory in a successive order based on the previous head pointer. For example, assume that the current head pointer is pointing to memory location 100, the next memory locations that the host processor would write a data element into would be location 101, 102, etc. The host processor 12 utilizes the tail pointer 22 to determine the clean portion of the ring buffer and the dirty portion of the ring buffer. The dirty portion of the ring buffer contains old data (i.e., already processed by the co-processor) and is delineated as the ring buffer entries between the head pointer and the tail pointer in a clockwise direction as shown in the Figure. The clean data indicates data elements that the host processor has written into the memory but have not been processed by the co-processor. The clean data is delineated as the ring buffer entries between the tail pointer and the head pointer in a clockwise direction. As such, if the ring buffer contains no dirty entries, the ring buffer is full and if it contains no clean data it is empty.

The co-processor, which may be a video graphics co-processor executing a graphics application 40, includes a local register 34 that stores the head pointer 20 and the tail pointer 22. The co-processor 16 is operably coupled to retrieve data from the tail of the ring buffer 30 and to update the tail pointer 22, thereby producing the updated tail pointer 38. The updated tail pointer is stored in the local register 34 and provided to the host processor 12. In a graphics application, the co-processor 16 is executing a 2-D and/or 3-D drawing application based on the data elements provided from the host processor 12 to the ring buffer memory section 24. In this situation, the commands contained within the data element would indicate 2-D and/or 3-D drawings, the display size, etc. The graphics data contained in the data elements would indicate the parameters of the objects being drawn, such as color information, physical display location, texel mapping information, etc. As the co-processor executes the graphics application 40 it stores the processed pixel information in the frame buffer 44 and, once a full screen of pixel information has been generated, it is provided to the display 42. Note that the display 42 may be a CRT monitor, LCD flat panel display, and/or a television monitor.

In this processing system 10, the host processor 12 and the co-processor 16 maintain a local copy of the most current head pointer and tail pointer. As such, the host processor does not need to poll the co-processor, or its registers to determine its status. As such, the host processor can continuously provide data elements to the ring buffer memory section 24 until the ring buffer is full. If the ring buffer is scaled properly, there should be minimal times when the ring buffer would be full. In addition, the co-processor 16, by having a local copy of the head pointer and tail pointer, can determine whether the ring buffer memory section 24 includes unprocessed data. Thus the need for polling between the host processor 12 and the co-processor 16 has been substantially eliminated thereby saving a substantial amount of processing time and improving the concurrency between the host processor and co-processor. As one in average skill of the art would readily appreciate, the processing system 10 could include multiple co-processors accessing the ring buffer wherein each of the co-processors and the host processor would maintain a local register and be responsible for updating their respective pointers to the ring buffer.

Figure 2:
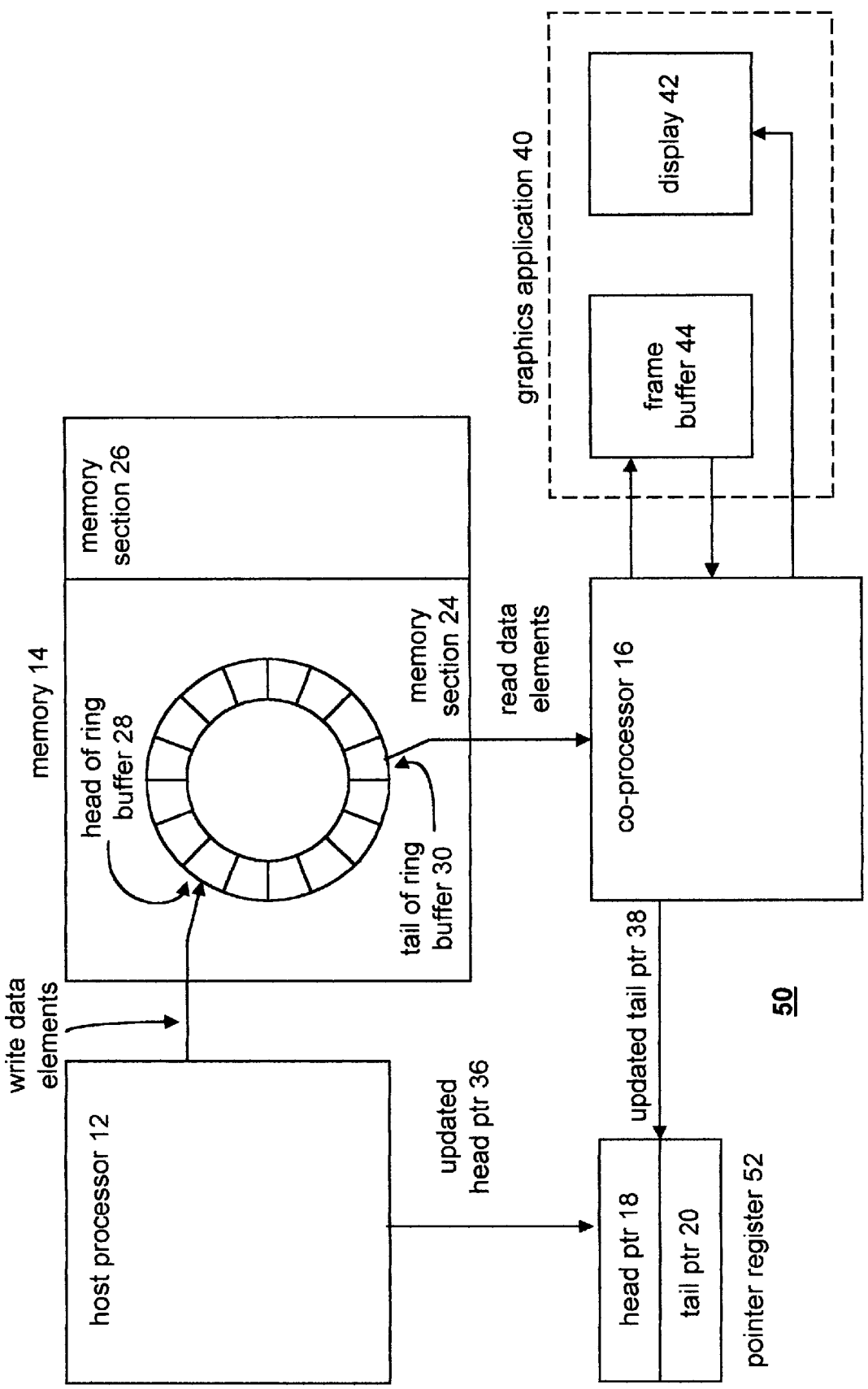
FIG. 2 illustrates a schematic block diagram of an alternate computing system that includes a host processor and co-processor in accordance with the present invention.

FIG. 2 illustrates a schematic block diagram of an alternate processing system 50 that includes the host processor 12, the memory 14, the co-processor 16 and the graphics application 40. In this embodiment, however, the host processor 12 and the co-processor 16 do not include a local copy of the head pointer 20, and the tail pointer 22. In this embodiment, the host processor 12 and the co-processor 16 share a pointer register 52. The host processor is responsible for updating the head pointer 36 and the co-processor is responsible for updating the tail pointer 38. As such, the host processor and co-processor access the same pointer register 52 to retrieve the desired information. As with the processing system of FIG. 1, the processing system of FIG. 2 may include multiple co-processors and exhibits the processing time benefits as that of the system of FIG. 1.

Figure 3:
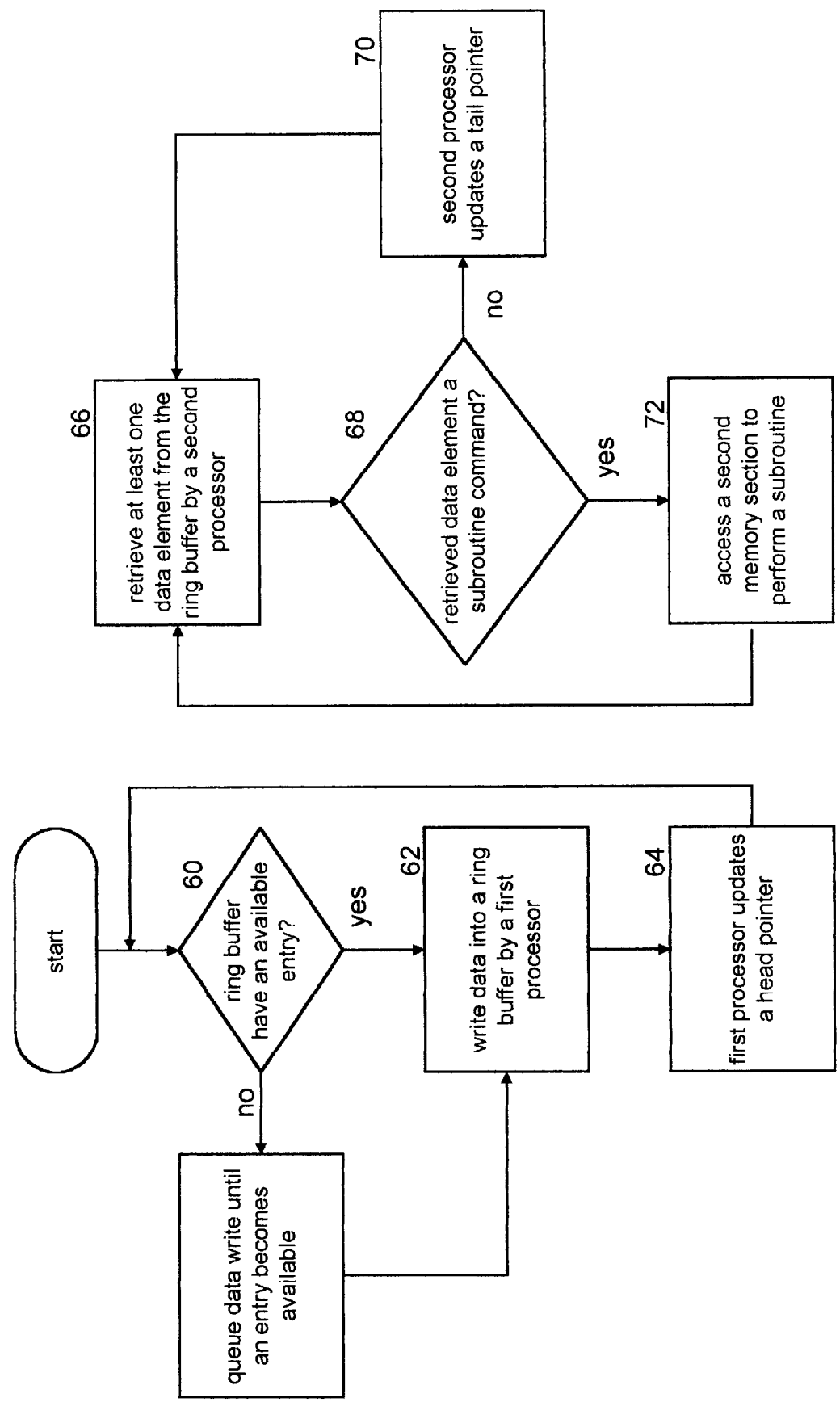
FIG. 3 illustrates a logic diagram of a method for multiple processors to utilize a ring buffer in accordance with the present invention.

FIG. 3 illustrates a logic diagram of a method for a processing system to utilize a ring buffer. The process begins at step 60 where a determination is made as to whether the ring buffer has any available entries. Such a determination is made based on the head pointer and the tail pointer. As previously mentioned, the tail pointer follows the head pointer wherein the data elements between the head pointer and tail pointer in a clockwise direction indicates available entries. If there are no entries between the head pointer and the tail pointer in the clockwise direction, with respect to the diagram of FIGS. 1 and 2, there are no available entries. If, however, there is at least one entry between the head pointer and tail pointer, an entry is available. If an entry is not available, the process proceeds to step 61 where the data write is queued until an entry becomes available.

If the ring buffer has available entries or one becomes available, the process proceeds to step 62. At step 62 a data element is written into the ring buffer by a first processor, i.e., the host processor. The data element may relate to a piece of data, or a command. Having written the data element into the ring buffer, the first processor updates the head pointer at step 64. Having done this, the process repeats at step 60 for each additional data element that the first processor desires to write into the ring buffer.

Concurrent with the processing steps of 60 through 64, the second processor, i.e., the co-processor, executes steps 66 through 72. At step 66, the second processor retrieves at least one data element from the ring buffer. Having retrieved the element, the process proceeds to step 68 where a determination is made as to whether the retrieved data element is for a subroutine. If so, the process proceeds to step 72 where the second processor accesses a second memory section to retrieve the subroutine and subsequently perform it.

If, however, the data element is not a subroutine command, the process proceeds to step 70 where the second processor updates a tail pointer and performs the corresponding function on, or with respect to, the data element. For example, the data elements may correspond to a graphics application and include graphics data and commands. As such, the second processor performs the commands upon the graphics data to achieve the desired graphics function.

The preceding discussion has presented a method and apparatus for a processing system that includes multiple processors to utilize a ring buffer. By having the processors include local copies of the tail and head pointer of a ring buffer, or having a shared resource, the host processor no longer has to perform a polling function to determine the status of the co-processors. As such, the host processor and co-processor achieve a higher degree of concurrency since the host processor no longer has to wait for the co-processor or to determine its particular status.

What is claimed is:

1. A processing system comprises:
   a host processor that includes local cache memory, wherein the host processor generates a plurality of data blocks that relates to a particular application, wherein each of the plurality of data blocks includes a plurality of data elements, and wherein each of the plurality of data elements includes at least one of: a command and data;

memory operably coupled to the host processor, wherein the memory includes a memory section that stores data elements of the plurality of data elements of one of the plurality of data blocks in a ring buffer manner as instructed by the host processor, wherein the host processor updates a head pointer as the data elements are stored in the memory section and stores the updated head pointer in the local cache memory;

a co-processor operably coupled to the host processor and the memory, wherein the co-processor includes local registers, wherein the co-processor receives the updated head pointer and stores the updated head pointer in one of the local registers, wherein the co-processor retrieves the data elements from the memory section to perform at least a portion of the particular application.

2. The processing system of claim 1, wherein the co-processor updates another one of the local registers with a tail pointer when the co-processor has processed the retrieved data elements, the co-processor provides the updated tail pointer to the host processor, wherein the host processor updates the local cache memory with the updated tail pointer.

3. The processing system of claim 1, wherein the memory further comprises a second memory section for storing at least one subroutine data block.

4. The processing system of claim 3, wherein the data element further comprises a command to access the at least one of the subroutine data block in the second memory section.

5. The processing system of claim 1, wherein the particular application includes a graphics display application, and wherein the data includes graphics data and the commands include image parameters.

6. The processing system of claim 5, wherein the co-processor processes the graphics data based on the image parameters and provides the processed data to a frame buffer for subsequent display.

7. A method for utilizing a ring buffer, the method comprises the steps of:

a) writing data into the ring buffer by a first processor;

b) updating, by the first processor, a head pointer that points to an address in the ring buffer of an entry that contains a most recent data element of the data;

c) communicating the updated head pointer to a second processor;

d) retrieving at least one data element from the ring buffer by (a) the second processor based on a tail pointer and the head pointer, wherein the tail pointer points to an address in the ring buffer of an entry that contains a least recent data element of the data;

e) updating, by the second processor, the tail pointer after the second processor has processed the at least one data element;

f) communicating the updated tail pointer to the first processor.

8. The method of claim 7 further comprises, prior to step (a), determining whether the ring buffer has at least one available entry based on the head pointer and the tail pointer.

9. The method of claim 7, wherein step (a) further comprises receiving a subroutine command as a data element of the data.

10. The method of claim 9 further comprises accessing, by the second processor, a second memory to retrieve a subroutine based on the subroutine command, and processing the subroutine by the second processor.

11. The method of claim 7, wherein step (a) further comprises receiving the data which corresponds to a graphics applications, wherein the data includes commands and graphics data.

12. The method of claim 11 further comprises processing, by the second processor, the graphics data based on the commands.

13. A processing system comprises:

a host processor that generates a plurality of data blocks that relates to a particular application, wherein each of the plurality of data blocks includes a plurality of data elements, and wherein each of the plurality of data elements includes at least one of: a command and data;

memory operably coupled to the host processor, wherein the memory includes a memory section that stores data elements of the plurality of data elements of one of the plurality of data blocks in a ring buffer manner as instructed by the host processor;

a co-processor operably coupled to the host processor and the memory, wherein the co-processor retrieves the data elements from the memory section to perform at least a portion of the particular application; and pointer register operably coupled to receive an updated head pointer from the host processor and an updated tail pointer from the co-processor, wherein the host processor updates the head pointer as the data elements are stored in the memory section and wherein the co-processor updates the tail pointer after processing retrieved data element.

14. The processing system of claim 13, wherein the memory further comprises a second memory section for storing at least one subroutine data block.

15. The processing system of claim 13, wherein the data element further comprises a command to access the at least one of the subroutine data block in the second memory section.

16. The processing system of claim 13, wherein the particular application includes a graphics display application, and wherein the data includes graphics data and the commands include image parameters.

17. The processing system of claim 16, wherein the co-processor processes the graphics data used based on the image parameters and provides the processed data to a frame buffer for subsequent display.

\* \* \* \* \*